United States Patent

Onda

[11] Patent Number: 5,189,910
[45] Date of Patent: Mar. 2, 1993

[54] FLUID SPEED MEASURING PROBE
[75] Inventor: Yoshio Onda, Tokyo, Japan
[73] Assignee: Honda Engineering Co., Ltd., Osaka, Japan
[21] Appl. No.: 687,664
[22] Filed: Apr. 19, 1991
[51] Int. Cl.⁵ .............................................. G01F 1/68
[52] U.S. Cl. ................................................. 73/204.25
[58] Field of Search ............ 73/204.22, 204.23, 204.24, 73/204.25, 189

[56] References Cited
U.S. PATENT DOCUMENTS

| | | | |
|---|---|---|---|
| 3,336,804 | 8/1967 | Poppendiek et al. | 73/204.24 |
| 4,616,505 | 10/1986 | Jouwsma | 73/204.26 |
| 4,856,329 | 8/1989 | Buck et al. | 73/204.22 |
| 4,856,330 | 8/1989 | Honda et al. | |
| 5,040,416 | 8/1991 | Demisch et al. | 73/204.25 |

Primary Examiner—Herbert Goldstein
Attorney, Agent, or Firm—Armstrong, Westerman, Hattori, McLeland & Naughton

[57] ABSTRACT

A fluid speed measuring probe utilizing a change in the resistance of a sensor made of a small piece of a single crystal of germanium in accordance with a change in temperature. The peripheral surface of the sensor is covered with an insulating member of a synthetic resin or the like and the outer periphery of the covered sensor is further covered with a spherical metal having heat conductivity. Thus, the directivity of the sensor is eliminated, thereby enabling accurate measurement of the speed of a fluid irrespective of the angle formed between the direction of the flow of the fluid and the probe.

12 Claims, 5 Drawing Sheets

FIG. 1
FIG. 2
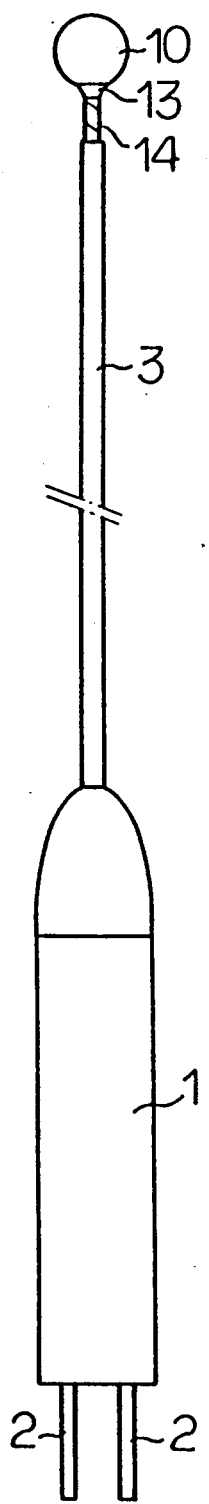
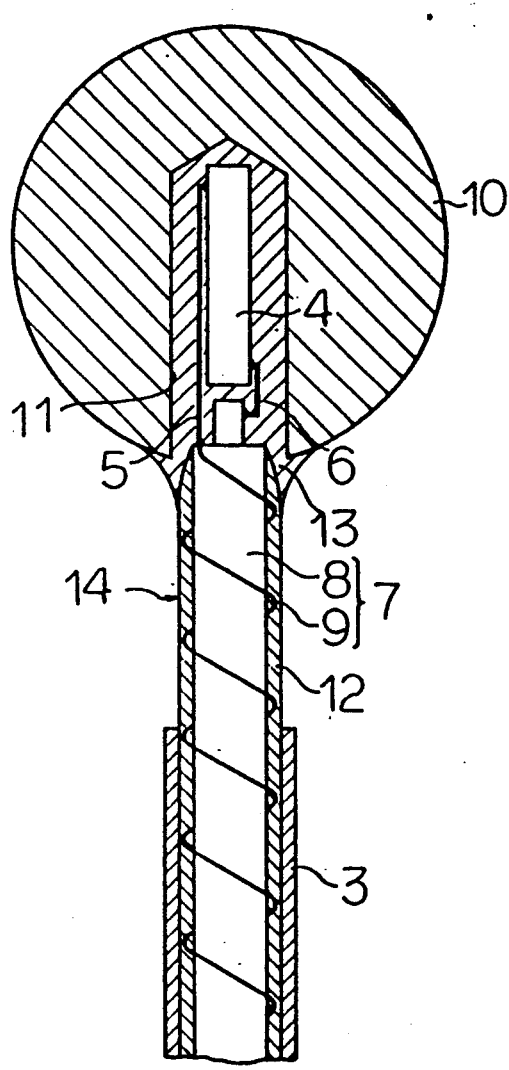

FLUID SPEED MEASURING PROBE

BACKGROUND OF THE INVENTION

1. Field of the Invention

The present invention relates to a fluid speed measuring probe for measuring the moving speed of a fluid and, more particularly, to a fluid speed measuring probe which utilizes a change in the resistance of a small piece of a single crystal of germanium with a change in temperature.

2. Description of the Prior Art

The applicant of the present invention discloses a fluid speed measuring probe composed of a sensor which is made of a small piece of a single crystal of germanium and coated with an electric insulating coating material in the form of a sphere so as to reduce the directivity of the sensor with respect to the direction of the flow of a fluid in Japanese Utility Model Laid-Open No. 47273/1988.

In this disclosure, by utilizing a small piece of a single crystal of geranium as a sensor, the problems in handling and the life time, which remain unsolved by a hot-wire anemometer utilizing a tungsten or platinum coil, are solved and by coating the sensor in the form of a sphere, the directivity of the sensor is reduced.

However, since an electric insulating synthetic resin is used as the coating material, the heat insulating property of the coating material makes it difficult to measure a minute change in the temperature of the probe surface which comes into contact with a fluid. In addition, it is impossible to completely eliminate the directivity of the sensor.

SUMMARY OF THE INVENTION

Accordingly, it is an object of the present invention to eliminate the above-described problems in the prior art and to provide a fluid speed measuring probe which has a low degree of directivity and which is capable of accurately measuring a fluid speed by using a small piece of a single crystal of germanium which is easy to handle and has a long life.

To achieve this aim, the present invention provides a fluid speed measuring probe comprising: a hollow base with a terminal provided at the longitudinal base end; a hollow supporting member which is attached to the forward end of the base; a sensor composed of a small piece of a single crystal of germanium disposed at the forward end of the supporting member; lead wires led from both longitudinal ends of the sensor; a wiring member connected to the lead wires and disposed at the hollow portion of the base; a spherical metal covering member provided with a sensor receiving hole into which the sensor is inserted; and an insulating member made of a synthetic resin for fixing the sensor in the state of being spaced from the supporting member, the wiring member and the inner surface of the covering member, respectively.

As the covering member, it is possible to use a sphere of a metal selected from copper, aluminum, gold and silver.

As the insulating member, it is possible to use an epoxy resin.

As the wiring member, it is possible to use a fine wire of phosphor bronze.

In a fluid measuring probe according to the present invention having the above-described structure, a voltage is applied to the sensor made of a small piece of a single crystal of germanium through the wiring member so as to keep the temperature constant, and a change in the resistance of the sensor which is caused when a fluid comes into contact with the sensor is converted into a voltage, current or power. The speed of the fluid is measured on the basis of the converted value.

Since the sensor made of a single crystal of germanium is covered with the spherical metal covering member, it is possible to accurately measure the speed of a fluid in the stream in substantially any direction.

Especially by utilizing a spherical metal material having a high heat conductivity, it is possible to accurately measure a fluid speed. As such a material, it is possible to use a metal selected from copper, aluminum, gold and silver.

By fixing the wiring member exposed from the forward end of the supporting member by the insulating member made of a synthetic resin, the insulating member works as a buffer so as to prevent the probe from being damaged.

As the insulating member inserted into the gap between the covering member and the sensor, a synthetic resin having a high heat conductivity and a low electric conductivity is adopted. For example, if an epoxy resin is adopted, it is possible to provide a preferred fluid speed measuring probe.

The above and other objects, features and advantages of the present invention will become clear from the following description of the preferred embodiments thereof, taken in conjunction with the accompanying drawings.

BRIEF DESCRIPTION OF THE DRAWINGS

FIG. 1 is an explanatory side elevational view of a first embodiment of a fluid speed measuring probe according to the present invention;

FIG. 2 is a partially enlarged view of the embodiment shown in FIG. 1;

DESCRIPTION OF THE PREFERRED EMBODIMENTS

First Embodiment

Figure 3:
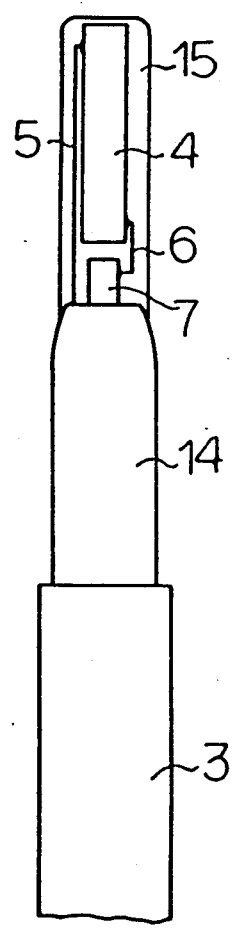
FIG. 3 is an explanatory side elevational view of a process for producing a fluid speed measuring probe according to the present invention.

FIG. 1 is an explanatory side elevational view of a first embodiment of a fluid speed measuring probe according to the present invention and FIG. 2 is a partially enlarged sectional view of the embodiment shown in FIG. 1.

In the drawings, the reference numeral 1 represents a hollow base having terminals 2 at the longitudinal base end thereof. A ceramic pipe, for example, is used as the base but the material is not specified.

The reference numeral 3 represents a hollow supporting member attached to the forward end of the base 1.

As the supporting member 3 nickel pipe, for example, is adopted with due consideration to the mechanical strength and the cost, but the material is not specified.

The reference numeral 4 denotes a sensor made of a parallelopiped small piece of a single crystal of germanium and lead wires 5 and 6 made of an electric conductor such as gold, silver or platinum are attached to the upper end of one side surface and the lower end of the other side surface, respectively, of the sensor 4.

The reference numeral 7 represents a wiring member connected to the lead wires 5, 6 led from the sensor 4. The wiring member 7 is made of a covered wire 8 which is a wire covered with an insulating material and a copper wire 9, and is disposed in the hollow portions of the supporting member 3 and the base 1 in the state in which the copper wire 9 is wound around the covered wire 8. In this way, the wiring member 7 is connected to the terminals 2 through the hollow portion of the base 1.

The copper wire 9 wound around the covered wire 8 is fixed by a fixing member 12 made of an epoxy resin. For this fixing member 12, an epoxy resin or the like is usable.

The reference numeral 10 represents a covering member made of a metal sphere having a sensor receiving hole 11. For the covering member 10, a metal having a high heat conductivity such as copper, aluminum, gold and silver is adopted. Among these, copper or aluminum is preferably used with due consideration of the cost and the processability.

When copper is used for the covering member 10, it is necessary to plate the covering member 10 with gold or the like, because the surface of the covering member 10 is apt to be oxidized. On the other hand, when aluminum is used, the oxidization of the surface is prevented by forming an anti-corrosive film.

The reference numeral 13 represents an insulating member for fixing the sensor 4 in the state of being spaced from the supporting member 3, the wiring member 7 and the inner surface of the covering member 10, respectively. For the insulating member 13, various materials are usable so long as they are at least electric insulating materials. For example, synthetic resins such as epoxy resin, silicon resin, aniline resin, phenol resin, polyester resin and urethane resin are usable. In this embodiment, an epoxy resin is used.

A process for producing a fluid measuring probe according to the present invention will now be explained.

The covered wire 8 which is a wire 0.26 mm in diameter covered with an insulating material and the copper wire 9 0.1 mm in diameter are first inserted into the supporting member 3 made of a nickel pipe 0.8 mm in outer diameter, 0.6 mm in inner diameter and 30 mm in length.

The copper wire 9 is wound around the covered wire 8 and the copper wire 9 is fixed by a fixing member 12 made of an epoxy resin. At this time, a part of the wiring member 7 which is made of the copper wire 9 wound around the covered wire 8 and fixed by the fixing member 12 is located at the forward end of the supporting member 3 so as to constitute an exposed portion 14.

The lead wires 5, 6 led from the parallelopiped sensor 4 of 0.3 mm×0.3 mm×1.5 mm are next connected to the covered wire 8 and the copper wire 9, respectively, of the wiring member 7, and the sensor 4 is fixed at the forward end of the supporting member 3 by an epoxy resin.

FIG. 3 is an explanatory side elevational view of this state.

An epoxy resin 15 is integrally provided with the exposing portion 14 of the wiring member 7 in the state in which the sensor 4 is located at the forward end of the exposed portion 14 and fixed with a space between the sensor 4 and the wiring member 7. The sensor 4 is disposed in a position at which the sensor 4 is not in direct contact with the supporting member 3 and the wiring member 7 so as to prevent the heat of the sensor 4 from being transferred to the supporting member 3 and the wiring member 7.

Thereafter, the wiring member 7 disposed in the hollow portion of the supporting member 3 is extended to the hollow portion of the base 1 and connected to the terminals 2 of the base 1, and the rear end of the supporting member 3 is attached to the base 1.

The sensor receiving hole 11 of the covering member 10 is filled with the insulating member 13 made of an epoxy resin, and the sensor 4 attached to the forward end of the supporting member 3 is inserted into the sensor receiving hole 11.

At this time, the insulating member 13 overflowing the brim of the hole 11 of the covering member 10 adheres to the surface of the covering member 10 and the exposed portion 14 of the wiring member 7, thereby firmly fixing the covering member 10 at the forward end of the supporting member 3.

A fluid speed measuring probe according to the present invention is produced in this way. Since the sensor 4 is covered with the spherical covering member 10 made of a metal having a high heat conductivity, it is possible to approximately eliminate the directivity of the sensor 4 with respect to the direction of the flow of a fluid, thereby enabling the accurate measurement of the speed of the fluid.

It goes without saying that since a small piece of a single crystal of germanium is used as the sensor 4, the problems in handling and the life time, which are defects in an anemometer using a hot wire of platinum, tungsten or the like, are solved.

Use of a metal such as copper and aluminum for the covering member 10 is advantageous in that since the heat conductivity is high, a change in the surface temperature is faithfully transmitted to the sensor 4 and in that since the processability is good, the production of a sphere having the sensor receiving hole 11 is facilitated.

Since an epoxy resin is utilized as the insulating member 13 for fixing the sensor 4 and the covering member 10, the production of the probe is easy, a change in the temperature of the surface of the covering member 10 is safely transmitted to the sensor 4 and it is possible to maintain the heat insurance property between the sensor 4 and the wiring member 7.

In addition, since the covering member 10 for covering the sensor 4 is fixed in the state of being spaced from the forward end of the supporting member 3, the heat insulating property between the sensor 4 and the supporting member 3 is maintained. Since the fixing member 12 made of an epoxy resin which fixes the wiring member 17 integrally supports the insulating member 13 and the covering member 10, the exposed portion 14 works as a buffer for preventing the probe from being damaged.

Figure 4:
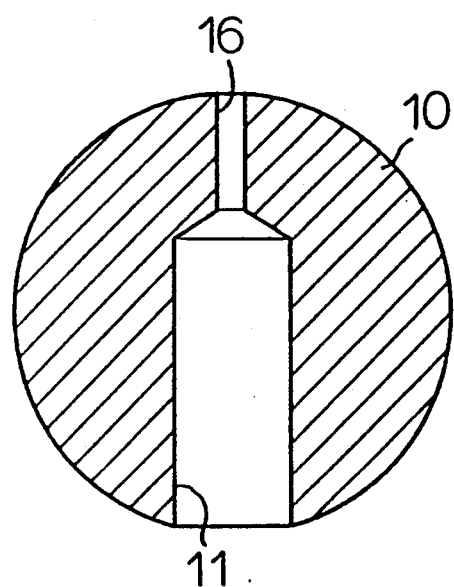
FIG. 4 is an explanatory sectional view of another example of a covering member.

The metal covering member 10 may have the structure shown in FIG. 4.

The covering member 10 shown in FIG. 4 is made of a metal sphere having a high heat conductivity and provided with the sensor receiving hole 11 and a through hole 16 as an air vent.

Copper, aluminum, gold, silver or the like is used for the covering member 10 as for the covering member 10 shown in FIG. 2. Among these, copper or aluminum is preferable in the respect of the processability and the cost.

In the case of using copper, the covering member 10 is subjected to plating for preventing oxidization, and in the case of using aluminum, an anti-corrosive film is formed on the covering member 10.

If the covering member 10 having this structure is used, when the sensor 4 is inserted into the sensor receiving hole 11, the epoxy resin with which the sensor receiving hole is filled is pushed into the through hole 16, thereby precluding the possibility of air remaining in the hole 11.

It is necessary to prevent air from remaining in the epoxy resin in the sensor receiving hole 11, because the heat insulation by the air makes accurate measurement of a speed impossible. It is easy to prevent air from remaining in the hole 11 by using the spherical covering member 10 shown in FIG. 4.

In a fluid speed measuring probe of this embodiment, a voltage is applied to the sensor 4 through the terminals 2 and the wiring member 7 so as to raise the temperature of the sensor 4 to a constant temperature.

The sensor 4 is cooled by the contact with a fluid. When a voltage is varied so that the sensor is maintained at a constant temperature, the change in the voltage is detected by the probe. It is thus possible to measure the speed of the fluid.

Figure 5:
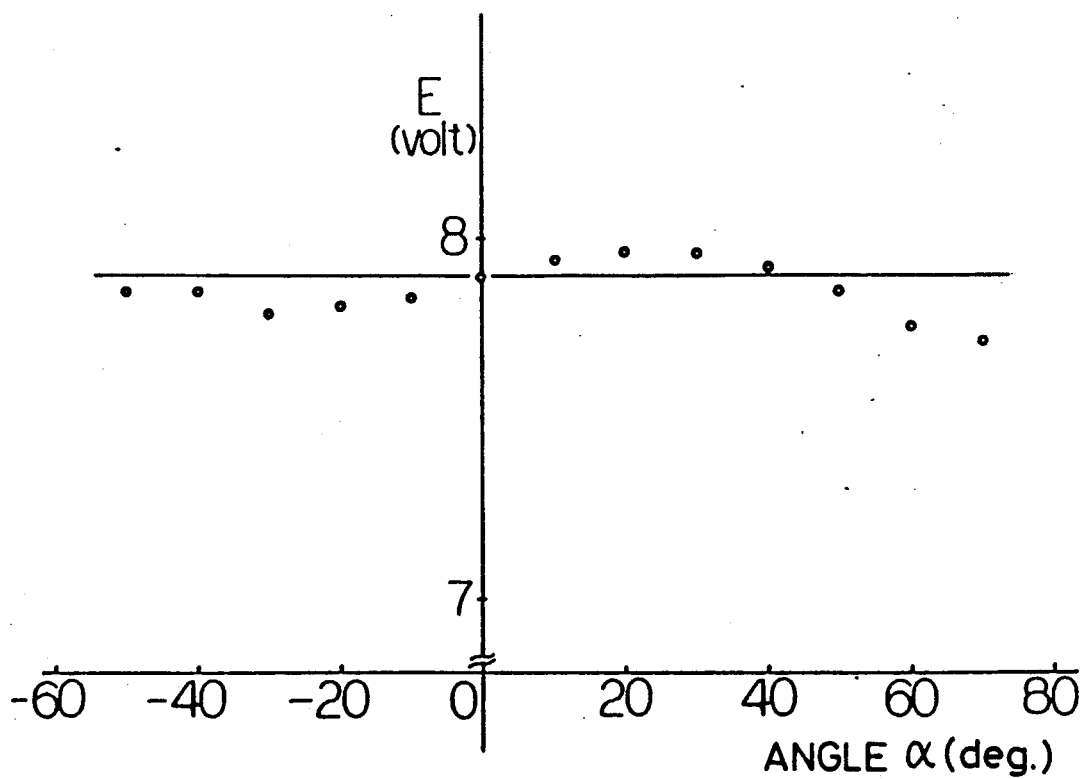
FIG. 5 shows the output characteristic of the first embodiment with respect to an angle between the probe and the flow of a fluid.

As an experiment, the voltage between the terminals 2 was measured while rotating the probe so as to vary the angle α which was formed between the surface orthogonal to the longitudinal axis of the probe and the flow of the fluid. The fluid speed was constantly 5 m/sec. The results are shown in FIG. 5, in which the ordinate represents the voltage between the terminals of the probe and the abscissa represents the angle α.

From the results of the experiment, it can be said that the fluid speed measuring probe of this embodiment is approximately free from the measuring error due to the angle formed between the longitudinal direction of the sensor 4 and the flow of the fluid, and that the directivity of the sensor 4 is approximately eliminated.

It goes without saying that the sensor 4 is completely nondirectional around the longitudinal axis thereof, although the results of the experiment are not shown. Thus, the present invention provides a fluid speed measuring probe with the directivity of the sensor greatly reduced.

Second Embodiment.

Figure 6:
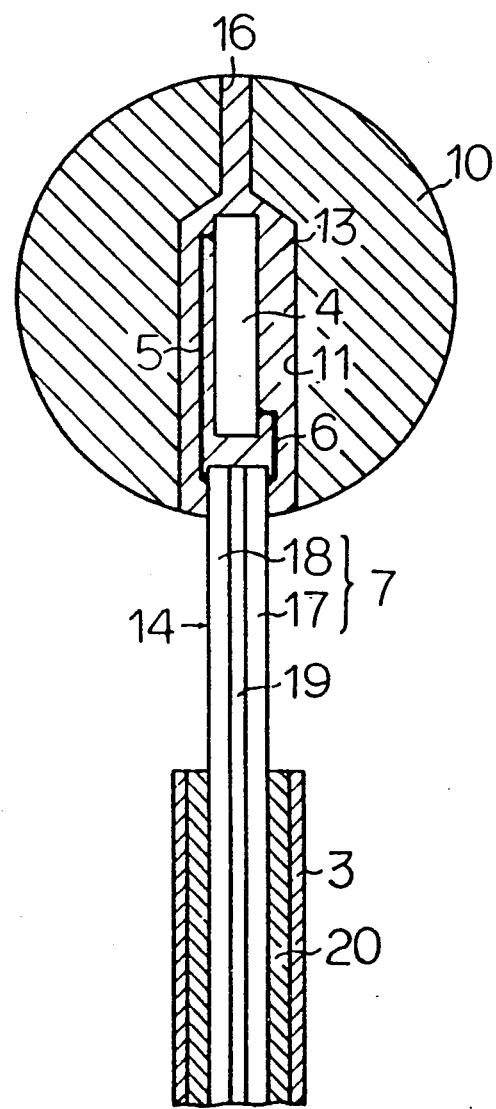
FIG. 6 is an explanatory sectional view of a second embodiment of a fluid speed measuring probe according to the present invention.

FIG. 6 is an explanatory sectional view of a second embodiment of a fluid speed measuring probe according to the present invention.

The reference numeral 4 represents a sensor made of a small piece of a single crystal of germanium like the sensor 4 in the first embodiment, and the lead wires 5 and 6 made of an electric conductor such as gold, silver and platinum are attached to the upper end of one side surface and the lower end of the other side surface, respectively, of the sensor 4.

The reference numeral 10 represents a metal covering member 10 similar to that shown in FIG. 4. The covering member 10 is a sphere provided with the sensor receiving hole 11 and the through hole 16 as an air vent.

A material having a high heat conductivity is selected as the covering member 10 as in the first embodiment.

In this embodiment, copper or aluminum is used and in the case of using copper, the covering member 10 is subjected to plating for preventing oxidization, while in the case of using aluminum, an anti-corrosive film is formed on the surface of the covering member 10.

The reference numeral 7 represents a wiring member connected to the lead wires 5, 6 led from the sensor 4. The wiring member 7 is made of fine wires 17, 18 of phosphor bronze which are bonded with each other by an epoxy resin 19.

The wiring member 7 having two bonded fine wires 17, 18 is inserted into the hollow portion of the supporting member 3 of a nickel pipe or the like and fixed by an insulating epoxy resin 20 as in the first embodiment.

The supporting member 3 is attached to the base (not shown) in the same way as in the first embodiment.

The sensor 4 is inserted into the sensor receiving hole 11 of the covering member 10 which is filled with an epoxy resin and fixed thereat in the same way as in the first embodiment. At this time, the epoxy resin overflowing the brim of the sensor receiving hole 11 is removed.

Each of the fine wires 17, 18 of phosphorus copper is produced by forming a material of 94% of copper and 6% of tin with a small amount of phosphorus added thereto into a fine wire having a diameter of 0.15 mm, and the length of the exposed portion 14 of the wiring member 7 located between the covering member 10 and the supporting member 3 is set at 5 mm.

The other portions of the second embodiment is the same as in the first embodiment.

Figure 7:
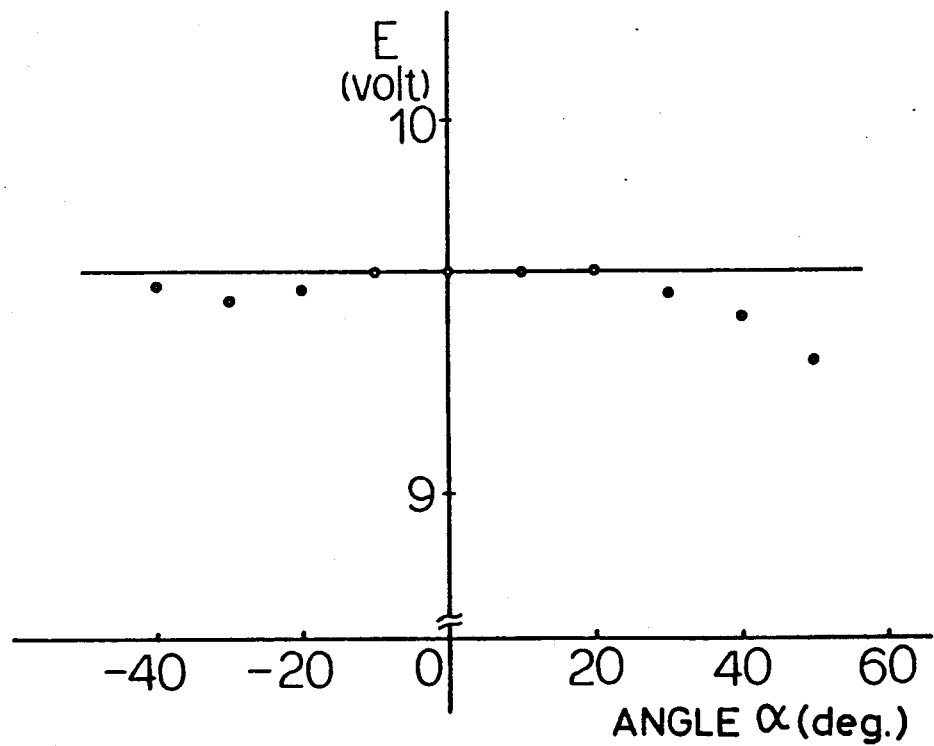
FIG. 7 shows the output characteristic of the second embodiment with respect to an angle between the probe and the flow of a fluid.

A similar experiment to that in the first embodiment was made in the second embodiment. The voltage between the terminals 2 was measured while rotating the probe so as to vary the angle α which was formed between the surface which was orthogonal to the longitudinal axis of the probe and the flow of the fluid. The fluid speed was constantly 5 m/sec. The results are shown in FIG. 7, in which the ordinate represents the voltage between the terminals of the probe and the abscissa represents the angle α.

From the results of the experiment, it can be said that the fluid speed measuring probe of the second embodiment is also approximately free from the measuring error due to the angle formed between the longitudinal direction of the sensor 4 and the flow of the fluid as the first embodiment, and that the directivity of the sensor 4 is approximately eliminated.

That is, it is possible to measure a fluid speed irrespective of the angle formed between the sensor 4 and the direction of the flow of a fluid because the sensor 4 is covered with the spherical covering member 10 made of a material having a high conductivity as in the first embodiment. The probe is thus capable of coping with a flow of a fluid in any direction.

Since an epoxy resin or the like is used for the insulating member 13 for fixing the sensor 4 in the state of being spaced from the supporting member 3, the wiring member 7 and the covering member 10, a change in the temperature of the surface of the metal covering member 10 is accurately transmitted to the sensor 4, thereby enabling the measurement of a fluid speed.

In addition, since the fine wires 17, 18 of phosphor bronze having an elasticity are used as the wiring member 7, the configuration of the probe is easily restored by the elasticity of the fine wires 17, 18 even if the probe is deformed when it comes into contact with another member, thereby enabling the configuration of the probe to be maintained.

Since it is possible to enhance the strength of the bonded portion of the wiring member 7 and the covering member 10 by using the fine wires 17, 18 of phosphor bronze as the wiring member 7, the insulating member 13 overflowing the brim of the sensor receiving hole 11 of the covering member 10 when the sensor 4 is inserted into the hole 11 is unnecessary. The insulating member 13 at the bonded portion between the covering member 11 and the wiring member 7 is therefore removed. Thus, it is possible to greatly reduce the measuring error when the angle α is large and improve the sensitivity of the probe.

As described above, since a fluid speed measuring probe according to the present invention utilizes a sensor composed of a small piece of a single crystal of germanium, the problems in handling and the life time, which are defects in a hot-wire anemometer utilizing tungsten, platinum or the like, are solved.

Since the sensor 4 is covered with the spherical covering member 10 made of a material having a high heat conductivity, it is possible to eliminate the directivity of the sensor around the longitudinal axis thereof and to greatly reduce the directivity with respect to the angle formed between the longitudinal axis of the sensor and the direction of the flow of a fluid, thereby enabling accurate measurement of a fluid speed irrespective of the angle formed between the sensor and the direction of the flow of a fluid.

In addition, since an epoxy resin is used for the insulating member for fixing the sensor and the covering member, the heat insulating property between the sensor and the supporting member is good and the heat transfer between the surface of the covering member and the sensor is also good, thereby enabling accurate measurement of a fluid speed.

Since the sensor and the covering member are spaced from the supporting member by a fixing member made of an epoxy resin or the like, it is possible to maintain the heat insulating property of the sensor. In addition, the elasticity of the fixing member or the wiring member can prevent the probe from being damaged.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A fluid speed measuring probe comprising:
   a hollow base with a terminal provided at the longitudinal base end thereof;
   a hollow supporting member which is attached to the forward end of said base;
   a sensor composed of a piece of a single crystal of germanium disposed at the forward end of said supporting member;
   lead wires led from both longitudinal ends of the sensor;
   a wiring member connected to said lead wires and disposed at the hollow portion of said supporting member and said base;
   a spherical metal covering member provided with a sensor receiving hole into which said sensor is inserted; and
   an electrically insulating and thermally conducting member made of a synthetic resin for fixing said sensor in the state of being suspended in said resin and spaced from said supporting member, said wiring member and the inner surface of said covering member, respectively.

2. A fluid speed measuring member according to claim 1, wherein said covering member is composed of a sphere of a metal selected from the group consisting of copper, aluminum, gold and silver.

3. A fluid speed measuring member according to either of claim 1 or 2, wherein said electrically insulating and thermally conducting member is composed of an epoxy resin.

4. A fluid speed measuring member according to any of claims 1 or 2, wherein said wiring member is composed of fine wires of phosphor bronze.

5. A fluid speed measuring probe according to claim 1, wherein said hollow base is formed of a material comprising a ceramic.

6. A fluid speed measuring probe according to claim 1, wherein said single crystal of germanium is in the form of a parallelopipe.

7. A fluid speed measuring probe according to claim 1, wherein said wiring member comprises a first wire covered with an insulating material and a second wire wound around the covered first wire.

8. A fluid speed measuring probe according to claim 7, wherein said second wire is fixed by an epoxy resin to said covered first wire.

9. A fluid speed measuring probe according to claim 1, wherein said spherical metal covering member comprises at least one metal selected from copper, aluminum, gold and silver.

10. A fluid speed measuring probe according to claim 9, wherein the spherical metal covering member comprises copper plated with gold.

11. A fluid speed measuring probe according to claim 1, wherein said electrically insulating and thermally conducting member made of a synthetic resin surrounds said sensor on all sides of said sensor.

12. A fluid speed measuring probe according to claim 1, wherein said spherical metal covering member comprises a sensor receiving hole and a through hole air vent.

* * * * *